United States Patent
He et al.

(10) Patent No.: US 9,692,745 B2
(45) Date of Patent: Jun. 27, 2017

(54) SINGLE SIGN-ON WITHOUT A BROKER APPLICATION

(71) Applicant: Microsoft Technology Licensing, LLC, Redmond, WA (US)

(72) Inventors: Jia Le He, Redmond, WA (US); Li Qing Xia, Seattle, WA (US); Alan Jonathan Lundeen, Seattle, WA (US); Dejan Subotic, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 14/684,139

(22) Filed: Apr. 10, 2015

(65) Prior Publication Data

US 2016/0301684 A1    Oct. 13, 2016

(51) Int. Cl.
*H04L 29/06*    (2006.01)
(52) U.S. Cl.
CPC ........ *H04L 63/0815* (2013.01); *H04L 63/108* (2013.01); *H04L 63/12* (2013.01)
(58) Field of Classification Search
None
See application file for complete search history.

(56) References Cited

U.S. PATENT DOCUMENTS

| | | | |
|---|---|---|---|
| 6,438,600 B1 | 8/2002 | Greenfield et al. | |
| 6,826,696 B1 * | 11/2004 | Chawla | H04L 63/0815 713/168 |
| 7,275,259 B2 | 9/2007 | Jamieson et al. | |
| 7,647,256 B2 | 1/2010 | Burch et al. | |
| 7,698,734 B2 | 4/2010 | Kupherstein et al. | |
| 7,958,547 B2 | 6/2011 | Andreev et al. | |
| 8,196,191 B2 | 6/2012 | Norman et al. | |
| 8,296,834 B2 | 10/2012 | Ritari et al. | |
| 8,327,426 B2 | 12/2012 | Kinser et al. | |
| 8,365,266 B2 | 1/2013 | Bogner | |
| 8,613,070 B1 | 12/2013 | Borzycki et al. | |
| 8,793,779 B2 | 7/2014 | Ferchichi et al. | |
| 8,819,444 B2 | 8/2014 | Shahbazi et al. | |
| 8,839,395 B2 | 9/2014 | Poliashenko et al. | |
| 8,863,126 B2 * | 10/2014 | Poore | G06F 8/00 717/118 |
| 8,863,246 B2 | 10/2014 | Norman et al. | |
| 2002/0087625 A1 * | 7/2002 | Toll | H04L 67/306 709/203 |
| 2003/0158949 A1 * | 8/2003 | Miller | G06F 21/41 709/229 |

(Continued)

FOREIGN PATENT DOCUMENTS

CN    102420836 A    4/2012

OTHER PUBLICATIONS

"Single Sign-On for Desktop and Mobile Applications using SAML and OAuth", Published on: May 31, 2014, Available at: https://developer.salesforce.com/page/Single_Sign-On_for_Desktop_and_Mobile_Applications_using_SAML_and_OAuth.

(Continued)

*Primary Examiner* — Nabil El Hady
(74) *Attorney, Agent, or Firm* — Workman Nydegger

(57) ABSTRACT

Facilitating single sign-on on a device having sandboxed applications. A method includes identifying a plurality of associated applications. Criteria are evaluated to identify a primary application. Authentication state is stored at the primary application. One or more portions of the authentication state can be used by the applications in the plurality of associated application for authentication.

20 Claims, 4 Drawing Sheets

(56) References Cited

U.S. PATENT DOCUMENTS

| | | | |
|---|---|---|---|
| 2003/0182421 A1* | 9/2003 | Faybishenko | H04L 63/08 709/224 |
| 2009/0007248 A1 | 1/2009 | Kovaleski | |
| 2010/0262717 A1* | 10/2010 | Critchley | H04L 12/42 709/251 |
| 2012/0272253 A1* | 10/2012 | Klein | G06F 11/3006 719/330 |
| 2014/0114946 A1* | 4/2014 | Ture | G06F 17/30864 707/709 |
| 2014/0250511 A1 | 9/2014 | Kendall | |
| 2014/0259134 A1 | 9/2014 | Scavo et al. | |
| 2015/0089580 A1* | 3/2015 | Manza | H04L 63/0838 726/1 |
| 2015/0180858 A1* | 6/2015 | Shanmugam | H04L 63/0815 726/8 |
| 2015/0244704 A1* | 8/2015 | Morrissey | H04L 63/0815 726/8 |
| 2016/0085602 A1* | 3/2016 | Jacobson | G06F 9/546 726/30 |
| 2016/0105422 A1* | 4/2016 | Burch | H04L 63/0823 726/6 |

OTHER PUBLICATIONS

International Search Report and Written Opinion for PCT/US2016/025806, mailed Jun. 17, 2016.
International Preliminary Report on Patentability issued in PCT Application No. PCT/US2016/025806 mailed Mar. 15, 2017.

\* cited by examiner

SINGLE SIGN-ON WITHOUT A BROKER APPLICATION

BACKGROUND

Background and Relevant Art

Computers and computing systems have affected nearly every aspect of modern Computers are generally involved in work, recreation, healthcare, transportation, entertainment, household management, etc.

In the current computing landscape, user devices, such as smart phones, tablets, wearable computers, etc. are ubiquitous. Typically, these user devices are able to have various applications, sometimes referred to as apps, installed on them. Each application may have some specific functionality that can be provided to a user. Often, these applications are associated with user accounts to provide a user with a personalized experience. For example, an email application provides the user with access to their personal emails. A social media application allows a user to post personal messages and receive personal messages. A VoIP application may have an associated user account that allows the user to communicate using their personal information.

To use these applications and the personalized features associated with them, a user needs to be logged into the application by authenticating the user to an external identity provider external to the device. This is done by providing authentication information to the identity provider from the application on the device to authenticate the user and allow the personalized user experience. The identity provider and/or related entities knowing that the user has been authenticated can provide personalized information and user experiences. Modern devices are capable of hosting a large number of applications for a user. To authenticate the user in all of the applications manually on a given device may require considerable effort if there are a large number of such applications on the device.

Single sign-on (SSO) is a feature that allows the user to enter authentication information into one application in a computing system, such as their credentials (e.g. username and password) only the first time the user uses one of the applications that requires authenticating with an identity provider. Any subsequent applications using that identity provider will be automatically signed in based on state obtained from the first authentication operation. However, certain sandboxed devices and/or platforms have various containers for enabling and using SSO. For example the Android® platform available from Google Corporation of Cupertino Calif. requires a specific broker application, or hero application associated with an identity provider to be provided on the system to enable the SSO functionality. Any authentication is performed using the broker application. If that particular application is not available on the device, none of the other applications installed on the device associated with the identity provider can use SSO. However, some identity providers may not have a broker application. In particular, typically a broker application will be an application with widespread use such that a very high percentage of devices (e.g. 80-90% of all devices) are likely to have the broker application installed. Some identity providers may simply not have such an application.

Alternatively SSO may be accomplished by having applications in the same sandbox or security container. For example, in a system using certificate-based sandboxes this can be accomplished by signing all of the applications for an identity provider with the same release certificate. However, some identity providers may have applications that are signed with different release certificates. This may be, for example, due to historical considerations such as business and application acquisitions or for other reasons.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for facilitating single sign-on on a device having sandboxed applications in containers that limit interaction between the applications. The method includes identifying a plurality of associated applications. Criteria are evaluated to identify a primary application. Authentication state is stored at the primary application. One or more portions of the authentication state can be used by the applications in the plurality of associated application for authentication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized, and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
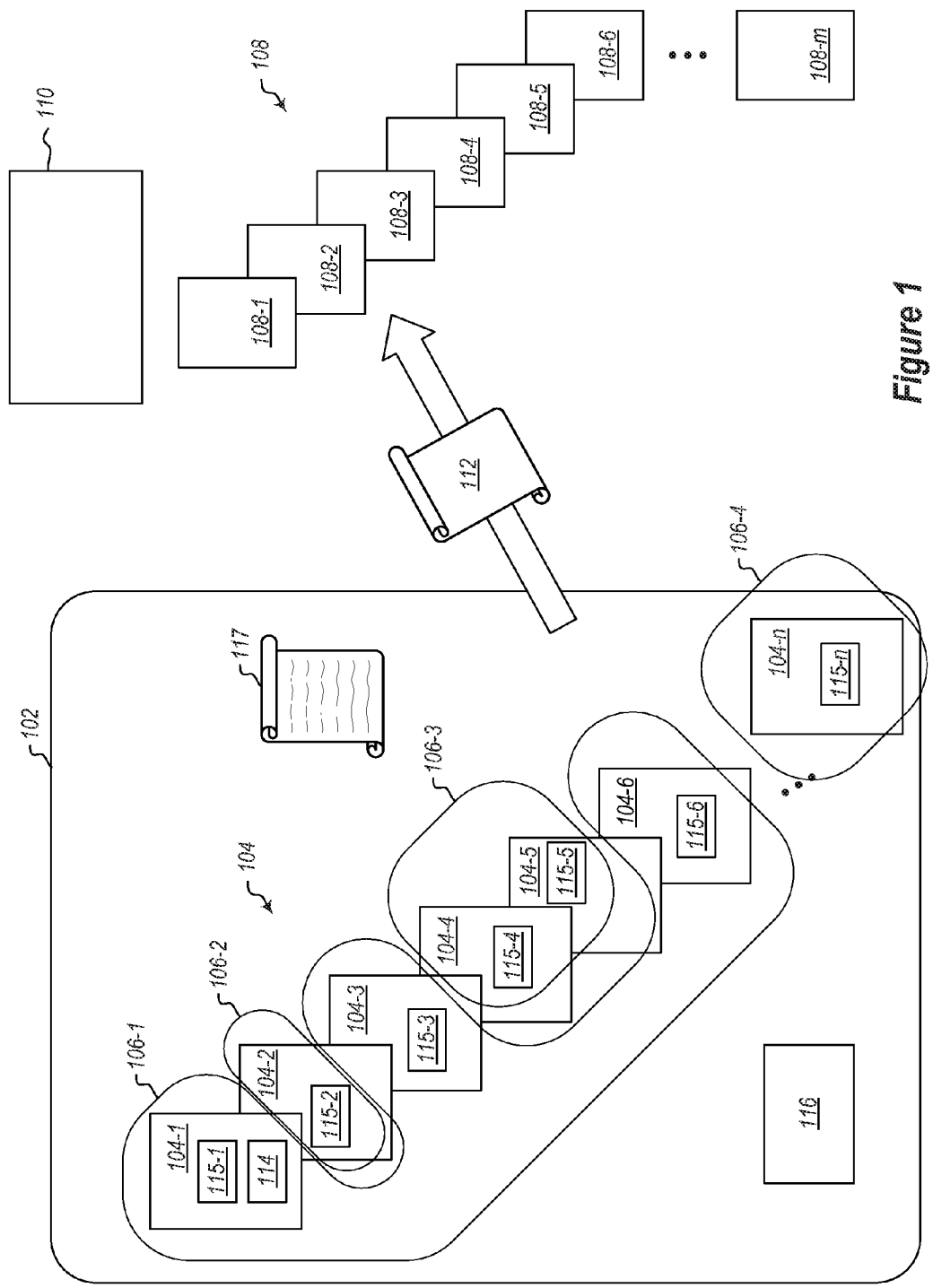
FIG. 1 illustrates a device implemented using a sandboxed platform, wherein the device is configured to perform single sign-on functionality.

Embodiments described herein can be used to implement single sign-on (SSO) on devices developed on platforms having sandboxed applications. Sandboxed applications are applications which run within certain security containers (i.e. sandboxes) and have limited communication with applications not within the same security container. SSO in this environment can be accomplished by identifying a plurality of applications associated with a particular identity provider irrespective of the security container in which the applications are installed on a device. An election algorithm identifies one of the applications in the plurality of applications to be a primary application. Authentication state is stored at the primary application. The authentication state includes authentication information that can be used by the applications to authenticate the applications. Each of the applications in the plurality of applications is able to perform the election algorithm (or at least to have access to the results of the election algorithm) to identify the primary application. This allows the applications in the plurality of applications to Obtain authentication information which can be used by the applications in the plurality of applications to obtain services from service providers associated with the identity provider.

Each application participating in SSO will expose a service which makes its authentication data available to other SSO-enabled applications on the device, and applications will connect with each other to exchange information. Access to these SSO services may be restricted to certain applications by checking their signing certificate public key against a list of trusted certificates via the built-in platform package management system. If multiple SSO-enabled applications are installed on a device, one application may be identified as the "primary" through a mutually agreed election algorithm. Other applications will be designated "non-primaries" and will proxy API requests to the primary using modalities, such as via inter-process communication (IPC). A backup system is also implemented to allow data to be retained even when the primary is uninstalled or when a new application is installed and becomes the primary based on the selection algorithm.

The selection of a single-primary algorithm may offer advantages over a multi-primary design. For example, embodiments may exhibit improved performance. For example one-to-one communication means fewer IPC calls. This may enable a system that runs faster from a user perspective. Additionally, this may allow for improved power consumption characteristics as less computing is performed, and thus less power consumed by a device. Embodiments may simplify consistency as there is a single source for authoritative data. Embodiments may include support for future authentication mechanisms such as biometrics or certificate-based authentication where authentication requests are delegated to a single application which maintains relevant state (such as a certificate store that is accessible only to a single application).

Referring now to FIG. 1, an example is illustrated. FIG. 1 illustrates a device 102. The device 102 is a based on a sandboxed platform. Such a platform may be the Android® platform available from Google Corporation of Cupertino, Calif. The device 102 has installed thereon, a plurality 104 of applications 104-1, 104-2, 104-3, 104-4, 104-5, 104-5, through 104-n. The applications may be installed in different security containers. In particular, FIG. 1 illustrates applications 104-1, 104-3, and 104-6 being installed in a first security container 106-1. Application 104-2 is installed in a second security container 106-2. Applications 104-4 and 104-5 are installed in a third security container 106-3. The remainder of the applications is installed in a fourth security container 106-4.

Each of the applications in the plurality 104 of applications is associated with an identity provider 110. The identity provider 110 is typically some centralized, well-known provider that offers a large number of services and data.

Each of the applications in the plurality 104 of applications is configured to receive personalized services from the service providers 108-1 through 108-m in the plurality of service providers 108. This personalization is enabled by the applicants being authenticated to their respective service and/or the identity provider 110. This is illustrated in FIG. 1 where authentication information 112 is provided to the identity provider 110 and/or one or more of the services in the plurality of services 108.

In the example illustrated in FIG. 1, each of the applications in the plurality 104 of applications is able to perform an election algorithm (or to otherwise obtain the results of the election algorithm) to obtain an ordered list 117. For example, FIG. 1 illustrates that each of the applications in the plurality of applications includes an election algorithm computation module 115-1 through 115-n. Each election algorithm computation module is configured to identify a plurality of associated applications and obtain results from an election algorithm on the plurality of associated applications to identify a primary application. Such results may be the ordered list 117. The ordered list 117 lists all of the applications in the plurality of application 104 in an ordered way depending on some ordering algorithm. For example, a platform on which embodiments are implemented may include the ability to obtain a list of installed applications. The election algorithm may be able to use this ability to obtain a list of applications associated with the identity provider 110. The election algorithm may order the applications associated with the identity provider 110 by alphabetical application name order; by version numbers of applications; by SDK version used to create the application (either automatic daily versioning or manual versioning performed when significant changes are made to the SDK); by protocol version used by the applications; by using an external previously prepared hard-coded, ordered list 117 of all possible applications; by an indication of the lifetime of applications on device 102 with preference given to applications being on the device the longest or most amount of cumulative time; by frequency of use of applications; by likelihood of being installed or uninstalled on the device 102, by stated user preference, by external metrics indicating an order of preference of applications, etc.

The election algorithm identifies a primary application which will store authentication state that can be used to authenticate any and/or all of the applications in the plurality 104 of applications associated with the identity provider 110. In the example illustrated in FIG. 1, the application 104-1 is identified as the primary application and includes the authentication state 114 from which the authentication information 112 may be derived.

The following illustrates one specific example of an election algorithm. First, the algorithm attempts to identify a specific preferred application. For example, if the identity provider is Microsoft Corporation of Redmond, Wash., the election algorithm may attempt to identify whether or not the Microsoft Account Authenticator application is installed on the device 102. If this application is installed on the device 102, it will be selected as the primary application. This is because this application will be able to provide support for future authentication mechanisms such as certificate-based authentication.

Otherwise, the application with the highest SSO version is chosen. This facilitates the availability of the latest interface version and may prevent a newer application from relying on an older application which does not support a newer API method.

If multiple applications share the highest SSO version the least recently installed application will be chosen. This helps reduce instances of churn where the primary application switches.

The authentication state 114 in the primary application will be the primary and authoritative set of state data. All other SSO clients on the device will consider themselves stateless and will proxy any API requests to the primary application 104-1, in some embodiment, via inter-process communication (IPC).

This approach allows better consistency of data (due to the single source) and improved performance (IPC communications are one-to-one rather than one-to-many) than a multi-primary approach.

Client-facing API objects do not directly interact with the authentication provider but will proxy requests through the primary application via an IPC call. This applies even in the local case (when the client happens to be the primary application). The IPC mechanism will function even when connecting locally which allows the logic to be simplified.

One issue that may arise with this particular single primary approach is that uninstalling or clearing data from the primary will immediately delete the data for all SSO applications with no opportunity for recovery. A "backup" concept may be implemented to facilitate continued SSO operation. APIs may be included to allow the primary application 104-1 to push a copy of the authentication state to one or more non-primary applications in the background and potentially retrieve the authentication state at a later time. In some embodiments, the state will be pushed to the top "x" number of applications as determined by the ordered list 117 produced by the election algorithm. For example, "x" may be 5 such that the authentication state 114 is pushed to the top 5 next applications after the primary application.

Figure 2:
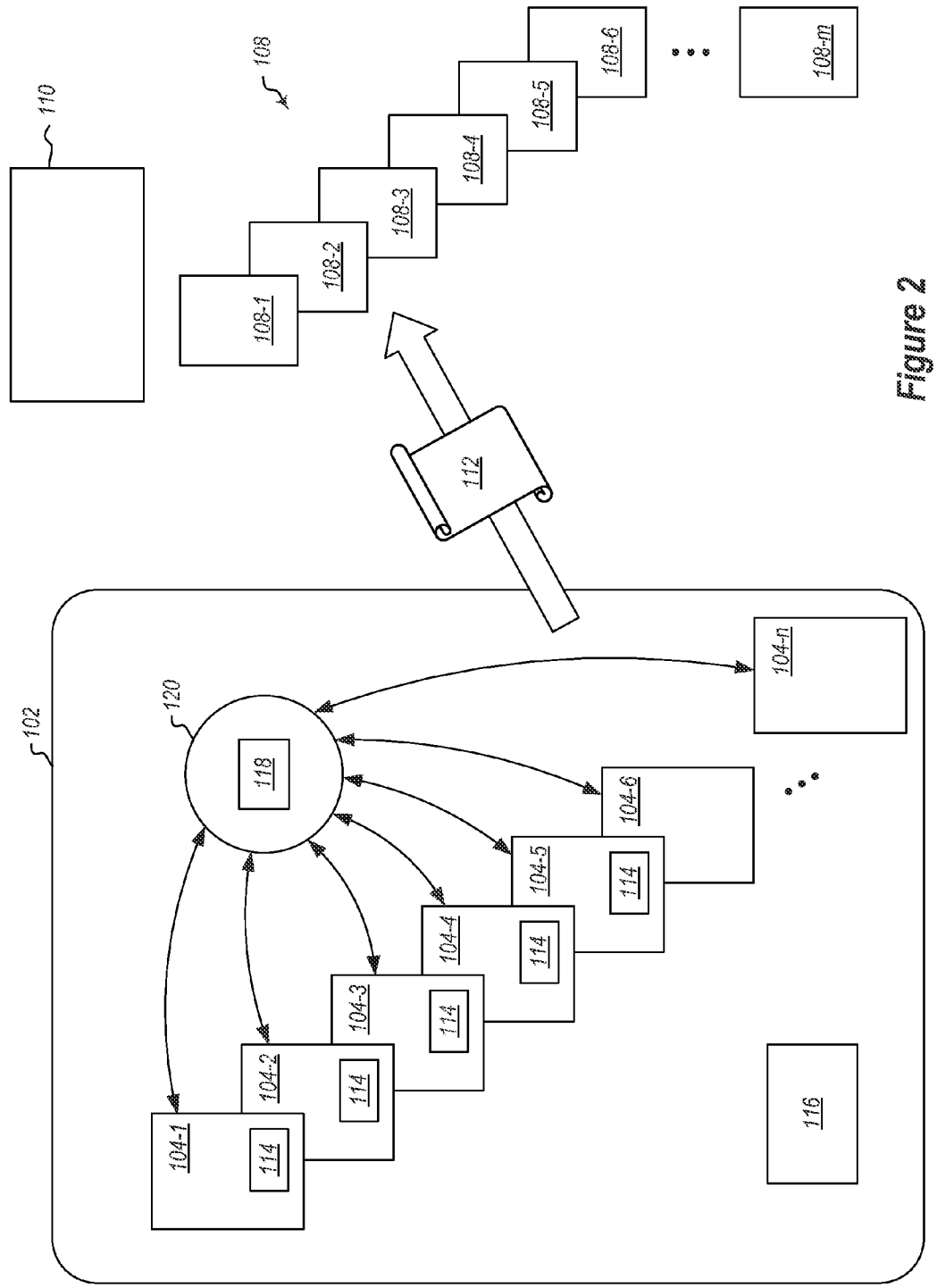
FIG. 2 illustrates additional details regarding the device implemented using a sandboxed platform, and configured to perform single sign-on functionality.

For example, reference is now made to FIG. 2. FIG. 2 illustrates a case where x=4, such that the authentication state 114 is pushed to four other applications 104-2, 104-3, 104-4 and 104-5. Note that even after receiving a backup copy of data, a non-primary application (such as any of applications 104-2 through 104-n) will continue to operate in a stateless manner, servicing API requests via the primary application 104-1. In the case of a non-primary application with authentication state 114 (such as any of application 104-2 through 104-5), it will not make use of any backup state it might possess. In some embodiments, the state in a non-primary application is only used (1) when retrieved to restore a primary application, or (2) if that non-primary application becomes a primary application (e.g. if the old primary is uninstalled).

The backup system may be configured, based on predetermined criteria to allow the primary application 104-1 to push data. In some embodiments, the authentication state will be pushed at the following times: when an account is added; when an account is removed; when an account receives updated authentication state after the user provides additional input (for example, when a user's account is compromised so their old authentication state is no longer accepted by the server, embodiments can ask the user to confirm their account, which results in new authentication state); when an account received updated authentication state from any flow AND the last backup was made more than X amount of time ago (e.g. 3 days).

In some embodiments, the backup is destructive. When an application receives a backup, any existing storage contents storing authentication state 114 are cleared and the new backup is applied for consistency with the primary application 104-1. The non-primary application will extract the backup into storage during an update backup call and assemble a backup blob from storage during a retrieve backup call.

Backup retry is implemented in some embodiments. Backup retry, in some embodiments, may occur automatically the next time the authentication state is updated as some embodiments will not update the "last backup" timestamp unless backup is successful.

When an application is attempting to obtain authentication state from the primary application 104-1, in the event the primary application 104-1 cannot be contacted (e.g. IPC binding fails), an application will retry the request to the primary application 104-1 to obtain the application state 114. Failing that, the application will move down the ordered list 117 produced by the election algorithm and attempt to contact the next backup application in the list to fulfill the request.

An application receiving an incoming IPC call for authentication state may assume itself to be the primary for the purpose of that call (e.g. may fulfill the request itself rather than proxy it onwards). Thus, a non-primary application will automatically become a primary application.

Some embodiments may implement a retry limit. For example, a limit of four retries is set to prevent an infinite loop (e.g. "primary" application returns a redirect, redirected request fails, application retries "primary", gets a redirect, retries, etc.)

When an application is installed for the first time and becomes the primary application, or when an existing primary application has its data cleared, embodiments may need to retrieve any existing backup from other applications on the device 102.

A migration handling component 116 is included on the device 102. This component 116 is configured to run specific code blocks in response to specific upgrade actions (e.g., an upgrade from v1 to v2). The migration component may include a storage field to note what version of the SDK is installed. If the SDK is initialized and this value in the storage field is set to a version lesser than the current one, the value may be updated and relevant migration code may be run. The migration handling component 116 can detect the following scenarios: SDK is invoked for the first time after the application was installed; SDK is invoked for the first time after the SDK version is upgraded; SDK is invoked for the first time after the application's data was cleared. This functionality is supported, in some embodiments, whether the SDK is invoked locally (e.g., from partner code creating an account manager instance) or remotely (e.g., an incoming IPC call).

Additional details are now illustrated regarding various restore actions that can be taken. When an application 104-1 is currently the primary application on the device 102 and no data is present in its storage storing authentication stage (e.g. it is the first run of the application or application data was erased), then the application may traverse the ordered list 117 obtained from the election algorithm (excluding itself) and query each application (e.g., in the example illustrated in FIG. 2, applications 104-2, 104-3, 104-4, and 104-5) for a data backup. The set of backup data retrieved is treated as authoritative and the query is stopped.

If an application was previously installed with an earlier non-SSO SDK and the application is upgraded to a SSO SDK and now participates in SSO, embodiments may be configured to ensure that the application performs as if it was just installed (i.e. delegates to the primary application if it is a non-primary application, or retrieves a backup from the next application in the ordered list 117 from the election algorithm if it is the new primary) and takes any existing SSO data. To achieve this, the migration system purges any previous account data during upgrade from a non-SSO to SSO SDK. One exception may be that if the application is upgraded and it is the only SSO application on the device 102, it may retain its data.

The following now illustrates a number of potential scenarios. In a first scenario three applications are installed together. Then the user opens one. In this case, all of these applications may select the same primary application from the ordered list 117 and the authentication state may automatically be consistent.

In a second scenario, a new application, which is ordered at the bottom of the ordered list 117 generated by the election algorithm, is installed into a working system. The new application may select the same primary application as the rest of the applications, and thus, the authentication state is consistent.

In a third scenario with two sub-cases a new application, which is ordered at the top of the ordered list 117 generated by the election algorithm, is installed into a working system. In the first sub-case, the new application was installed from the store. On a first run (seeing it is the primary application and has no authentication state 114) the new application queries "previous" primary application(s) in the ordered list 117 in order until one returns a backup. That backup is then applied to the new primary and is authoritative. Alternatively, the previous primary application sees the new primary application based on a broadcast message indicating the new primary application was installed, and as a result, pushes the authentication state to the new primary application.

In the second sub-case of the third scenario, an application was already Running with a non-SSO SDK and was updated to a SSO SDK. On first run, seeing it is the primary application and has not run with SSO before, the new primary application will query previous primary application(s) as in the new install case. This scenario may use the migration handling component 116.

In a fourth scenario a primary application in a working system is uninstalled. All remaining applications automatically choose the next-in-line from the ordered list 117 generated from the election algorithm as the primary application and make requests there. That primary application uses its latest backup copy as the authoritative source.

In a fifth scenario a primary application has its application data cleared from its settings. In this scenario, the same behavior as if a new application was installed at the top of the ordered list 117 is exhibit Namely, the application sees that it is the primary application and has no migration flag so it performs ordered queries on application in the ordered list 117 until it finds a backup.

In a sixth scenario, two applications are upgraded from a non-SSO SDK to an SSO SDK at the same time, ordered as first and second at the top of the ordered list 117. The first application queries the second application for backup. The second application does not re state existing in its storage from before the SSO SDK was available and the first application continues querying other applications.

The following now illustrates various features related to security. In particular, it is important that rogue application not be able to obtain the authentication state 114 from the primary application 104-1 (or any other application for that matter). In some embodiments, this can be accomplished by using signature verification of servers and clients. In this case, one application will be a server and the application it is communicating with will be a client. A signature verification service 118 will verify the identity/signature of a client at the beginning of every service method call. Given that clients are anticipated to be making only one or two calls into a single service at a time, the overhead of checking signature hashes on each call may not be onerous. The client will verify the identity/signature of each service returned before attempting to connect to it. The use of an explicit intent to connect to each service will ensure the client is connected to the correct service.

Additionally, a callback provides the name of the package containing the service that was actually bound, this, in some embodiments, is double-checked to ensure it is the expected package.

Embodiments may include functionality for error handling. Error codes can be used for informational or debugging purposes, or for other purposes, such as knowing when to retry a request. The following illustrates a list of example error codes:

Unknown: An error not falling into any other code; see message for details
ClientNotAuthorized: Client does not have permission to call service, e.g. signature not in an allowedlist
UnsupportedClientVersion: The server refuses to provide data to this version of the client (e.g. returned if a version of the SDK is later found to have a large problem)
StorageException: A problem was encountered reading/writing data from storage.
IllegalArgumentException: The request contained an invalid set of parameters.
AccountNotfound: The requested account was not found.
NetworkException: The request could not be completed due to a network error.
ServerException: The request could not be completed due to a server Error.
InvalidResponseException: The request could not be completed because the server returned a response that could not be parsed.
PrimaryRedirectException: The request may be redirected to the specified app.
ClientConfigUpdateNeededException: The request could not be completed because the caller needs to update its configuration settings.

A client may be sure to respect the UnsupportedClientVersion error. In particular, if received from a service, the client may act as if that service does not exist (e.g., in consideration of finding the newest authentication state). This allows future SDK versions to gracefully decline to communicate with specific older versions if needed.

A special error case is the "primary redirect" where the presumed primary application returns an error code indicating the request may be resent to another application. In this case an extra parameter identifying a redirect endpoint will be returned. The primary fallback component may handle reattempting the request with the specified application. This allows the primary application ordering algorithm to be updated in future releases of the SDK.

Some embodiments may include the ability to prompt a user to upgrade to another application. For example, embodiments may include properties in a service declaration that will allow other applications to potentially prompt the user to upgrade an application with an old or buggy SDK.

Some embodiments may include the ability to pretend not to exist to older applications. For example, the UnsupportedClientVersion error illustrated above allows future editions of the SDK to refuse to interact with specific earlier versions, e.g. in the case of a critical issue discovered in an earlier version. A client receiving an UnsupportedClientVersion error may act as if that particular service does not exist.

Some embodiments may include the ability to propagate to all applications on modification. For example, application A obtains fresh authentication state so it pushes the new authentication state to applications B, C, and D.

Some embodiments may include the ability to propagate authentication state to the primary application on modification. For example, a user obtains new authentication state in application A, so the application A pushes the new state to application B, which is algorithmically elected to be the primary application. When application C's local authentication state does not work (e.g. it is expired) it queries B (but not A) since it knows B is the primary and would have the freshest DA.

Some embodiments may include the ability to propagate authentication state to the primary application on modification. For example, application A obtains fresh authentication state so it pushes the new state to application B which is algorithmically elected to be the primary application. When application C needs authentication state it always queries the primary application to get the latest state.

Some embodiments may include the ability to pull for application state, when needed, from all applications. For example, application A requests a ticket with the local authentication state and receives an "authentication state expired" error, so application A queries all other applications on the device for their authentication state and picks the freshest one.

Some embodiments may include functionality for verification of a service caller. For example, embodiments may include a method that would verify the client's identity and then return a session token that could be passed to subsequent calls. The token could then be verified against a list of open tokens without invoking the package manager.

Some embodiments may include functionality for authentication state migration during a first run as primary with pre-SSO data. For example, f an application is upgraded from a pre-SSO SDK to an SSO SDK and became the primary at that time, the application could query backup data from the next primary in line (going down the ordered list 117 until a backup is found) and then merge that backup data with the pre-SSO data in storage at the primary application as follows: the device ID information from the SSO backup data will be imported; any accounts and authentication state and/or tokens from the SSO backup data will be imported; and any accounts from the application's pre-SSO storage that are not present in the SSO backup data will be imported. Authentication state for these accounts will not work with the new device ID no these users will need to re-sign in (but will not be removed from the device).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
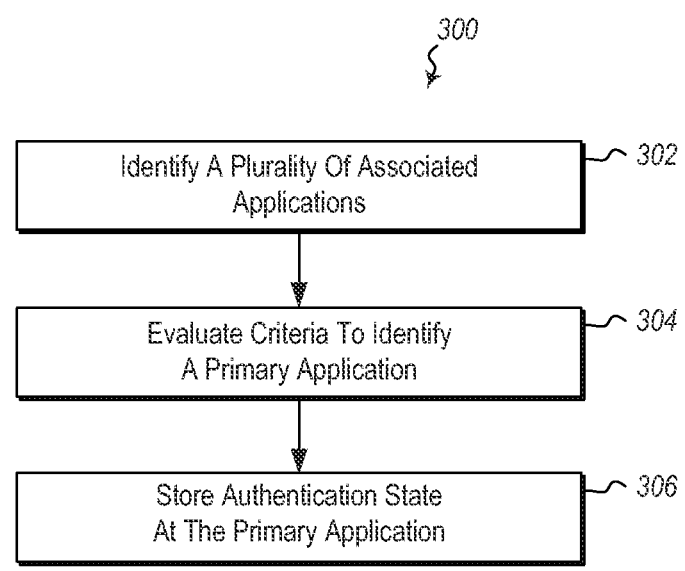
FIG. 3 illustrates a method of facilitating single sign-on on a device having sandboxed applications.

Referring now to FIG. 3, a method 300 is illustrated. The method 300 may be practiced in a computing environment. The method 300 includes acts for facilitating single sign-on on a device having sandboxed applications in containers that limit interaction between the applications. The method includes identifying a plurality of associated applications (act 302). For example embodiments may identify all applications on device 102 that are associated with the identity provider 110.

The method 300 further includes evaluating criteria to select a primary application (act 304). For example, an election algorithm may be performed to create the ordered list 117. The ordered list 117 could be used to identify a primary application.

The method 300 further includes storing authentication state at the primary application (act 306). One or more portions of the authentication state can be used by the applications in the plurality of associated application for authentication. Thus, for example, the primary application 104-1 may store authentication state 114. Authentication information 112 derived from the authentication state 114 may be used to authenticate applications in the plurality 104 of applications to the identity provider 110 or one or more of the services in the plurality 108 of services.

The method 300 may be practiced where evaluating criteria comprises identifying an ordered list 117 of applications from the plurality of associated applications to identify back-up locations for the authentication state. In this case, the method may further include storing at least a portion of the authentication state in a top n number of applications from the ordered list. Thus for example, as illustrated in FIGS. 1 and 2, the ordered list 117 may identify applications in an ordered fashion. FIG. 2 illustrates the top four next applications 104-2, 104-3, 104-4, and 104-5 have the authentication state 117 stored on them.

The method 300 may be practiced where storing at least a portion of the authentication state in a top n number of applications from the ordered list 117 is performed as a result of some event occurring. For example, the authentication state may be updated in the back-up locations as a result of a user account being added to an application. Additionally or alternatively, the authentication state may be updated in the back-up locations as a result of a user account being removed from an application. Additionally, or alternatively, the authentication state may be updated in the back-up locations as a result of user interaction with an application to provide authentication input. The user interaction could be interaction with the primary application, with one of the other applications in the plurality 104 of applications, with an overlay of the primary application onto another application, etc. For example, the user interaction may be a user updating a security credential, such as a username or password. Additionally or alternatively, the authentication state may be updated in the back-up locations as a result of expiration of pre-determined time. For example, authentication state may be updated periodically to ensure that the authentication state in the back-up locations is fresh. Additionally or alternatively, the authentication state may be updated in the back-up locations as a result of an application version change. Additionally or alternatively, the authentication state may be updated in the back-up locations as a result of a change in authentication state, such as a change in the content or format. For example, if the authentication information 114 at the primary application changes, those changes can be provided to the back-up locations.

The method 300 may further include determining that the authentication state is no longer available from the primary application due to the primary application being removed from the device. In some embodiments, the method may further include promoting a top application from the top n application to the primary application. Thus, for example, the primary application 104-1 may be removed from the device 102. This may result in the application 104-2 being promoted to the primary application.

The method 300 may further include determining that the authentication state is no longer available from the primary application due to the authentication state being unavailable from the primary application. For example, the authentication state may be wiped from the application, corrupted, or otherwise made unavailable. In some such embodiments, the primary application obtains the authentication state from one of the top n applications. Typically, the primary application will obtain the authentication state from the top application from the top n applications. Thus, for example, the primary application 104-1 may have its state wiped. This would include the authentication state 114 being wiped. The primary application 104-1 may attempt to obtain the authentication state 114 from one or more of the back-up applications 104-2, 104-3, 104-4, and/or 104-5, and will typically retrieve the authentication state 114 from the back-up application 104-2 as it is the highest on the ordered list 117 below the a application 104-1.

The method 300 may be practiced where selecting a primary application comprises selecting an application based on one or more factors. One such factor may be an alphabetical ordering by application name. Alternatively or additionally a factor may be application versions. Thus for example, preference may be given to newer application versions. Alternatively or additionally a factor may be an SDK version. This may be either automatic daily versioning that occurs or manual versioning. Thus, for example, some embodiments may create an ordered list 117 that has a preference for applications created with newer SDK version. Alternatively, or additionally, a factor may be protocol versions. Thus for example, certain security protocols used by applications may be preferred over other protocols used by other applications when ordering applications. Alternatively, or additionally, a factor may be a hard coded list. For example, embodiments may use an external list that has been pre-ordered by some manual or automated process. The external list can be made available to the device 102. Any applications on the device 102 that also appear in the external list will be ordered in the ordered list 117 in the same order as they appear in the external list. Alternatively, or additionally, a factor may be lifetime of applications on the device. For example, preference may be given to applications that have been installed for longer periods of time (either uninterrupted or cumulatively). In one embodiment, by preferring applications that have been installed on a device for longer periods of time uninterrupted, less primary application churn will occur when new applications are installed. Alternatively, or additionally, a factor may be frequency of application use. Alternatively, or additionally, a factor may be likelihood of application being installed or uninstalled. Alternatively, or additionally, a factor may be a specified user preference. Alternatively, or additionally, a factor may be external metrics. For example, research may have been performed regarding applications. Such research may quantify application use or usefulness. The results of this research may be obtained and used as a factor in the election algorithm.

The method 300 may further include selecting the plurality of associated applications from an allowed list of applications that can be authenticated on the device. Thus for example, a list of applications, along with authentication information, may be provided on the device 102. As applications try to communicate with each other for SSO purposes, they will first be authenticated against the allowed list. If an application that is trying to communicate with other applications is not authenticated to the allowed list, it will not be allowed to communicate with other applications in the plurality 104 of applications.

The method 300 may further include receiving a request for information from the authentication state from an application that is not in the plurality of associated applications. In this example, the method 300 may further include determining that the application is not in the plurality of associated applications. As a result, the method 300 further includes denying the request.

The method 300 may be practiced where each of the applications in the plurality of associated applications can communicate with the primary application and with each other. Thus, as illustrated in FIG. 2, each of the applications in the plurality 104 of applications can communicate with each other. This is represented by the hub 120 which illustrates that applications can communicate with one another.

Figure 4:
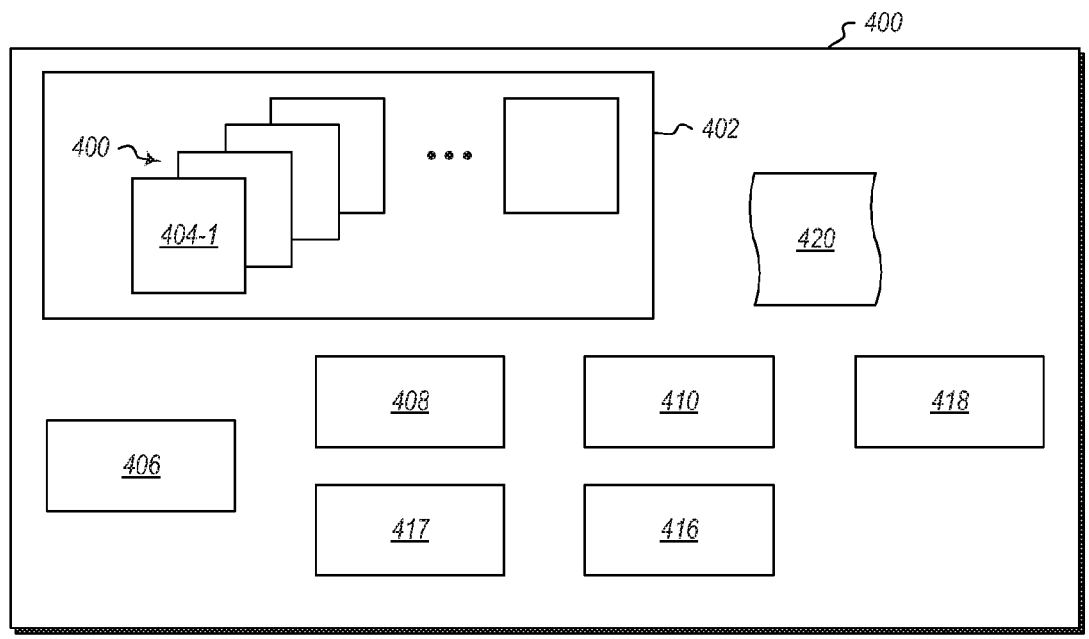
FIG. 4 illustrates an example sandboxed computing system.

Referring now to FIG. 4, a sandboxed system 400 is illustrated. The sandboxed system 400 includes a memory 402 configured to store a plurality of associated applications 404.

The sandboxed system 400 further includes a security unit 406 configured to maintain security containers to generate a plurality of sandboxes. FIG. 1 illustrates examples of containers 106-1 through 106-4. At least some of the applications in the plurality of associated applications are not in the same sandbox.

The sandboxed system 400 further includes a processor 408 configured to determine a primary application 404-1 from the plurality of associated applications 404 based on one or more known criteria. The primary application comprises authentication state (such as authentication state 115-1 as illustrated in FIG. 1) at the primary application 404-1, where portions of the authentication state can be used by the applications in the plurality of associated application for authentication.

The processor 408 may be implemented as one or more processors coupled to one or more computer-readable media 410. The computer readable media, while shown external to the memory 402, may in some embodiments, be implemented with the memory 402. The processor 408 and computer readable media 410 may be configured to identify a plurality of associated applications and obtain results from an election algorithm on the plurality of associated applications to identify a primary application The sandboxed system 400 further includes the primary application 404-1. The primary application 404-1 is configured to store authentication state (e.g. authentication state 114 in FIG. 1) at the primary application 404-1. At least a portion of the authentication state can be used by the applications in the plurality of associated application for authentication.

In some embodiments, the sandboxed system 400 may be implemented where the processor 408 identifies an ordered list 417 of applications from the plurality of associated applications 404 to identify back-up locations for the authentication state. A top n number of applications from the plurality of associated applications as identified by the ordered list 417 may include back-up information including at least a portion of the authentication state.

The sandboxed system 400 may include an update module 416 that is configured to update the back-up information in the top n number of applications from the plurality of associated applications 404 as a result of one or more of adding a user account, removing a user account, user interaction to provide authentication input, expiration of predetermined time, an application version change, or a change in authentication state.

The sandboxed system 400 may include a validation module 418 that is configured to determine that the authentication state is no longer available from the primary application due to the primary application being removed from the device, and as a result promote a top application from the top n application to the primary application.

The sandboxed system 400 may include a validation module 418 that is configured to determine that the authentication state is no longer available from the primary application due to the authentication state being unavailable from the primary application, and as a result, cause the primary application to obtain the authentication state from one of the top n applications.

The sandboxed system 400 may be implemented where the processor is configured to select applications based on at least one or more of an alphabetical order by application name, application versions, SDK versions, protocol versions, a hard coded list, lifetime of applications on the device, frequency of application use, likelihood of application being installed or uninstalled, a specified user preference, or external metrics.

The sandboxed system 400 may include an allowed applications data structure 420. The applications in the plurality of associated applications are selected from an allowed list of applications in the allowed application data structure that can be authenticated on the device.

The sandboxed system 400 may be implemented where each of the applications in the plurality of applications is configured to receive a request for information from the authentication state from an application that is not in the plurality of associated applications, determine that the application is not in the plurality of associated applications, and as a result deny the request.

The sandboxed system 400 may be implemented where each of the applications in the plurality of associated applications is configured to communicate with the primary application and with each other.

Figure 5:
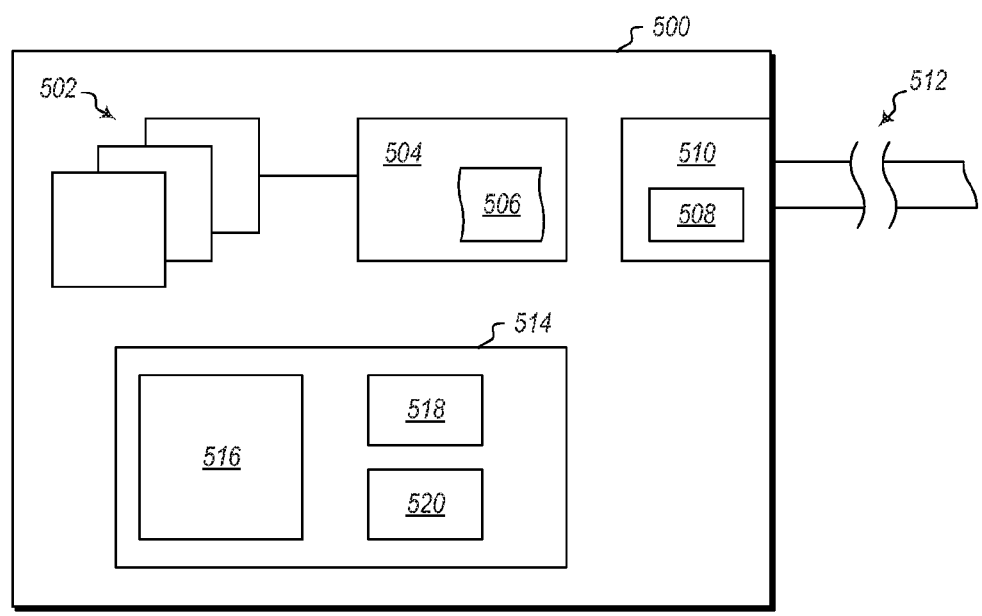
FIG. 5 illustrates a general purpose computing system on which embodiments of the invention may be implemented.

Referring now to FIG. 5, embodiments may be practiced by a computer system 500 including one or more processors 502 and physical storage computer-readable media 504 such as computer memory. In particular, the computer memory may store computer-executable instructions 506 that when executed by one or more processors cause various functions to be performed, such as the acts recited in the embodiments.

Embodiments of the present invention may comprise or utilize a special purpose or general-purpose computer 500 including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media (such as media 504). Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media 504 includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network 512 and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM 508 within a network interface module 510 (e.g., a "NIC"), and then eventually transferred to computer system RAM and/or to less volatile computer-readable physical storage media such as media 504) at a computer system 500. Thus, computer-readable physical storage media can be included in computer system components that also (or even primarily) utilize transmission media.

Computer-executable instructions 506 comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The computer system 500 may further include a user interface 514. The user interface 514 may include a display 516 for displaying information to a user, as well as various hardware interface elements 518 (such as keyboards, touchscreens, buttons, pointing devices, sensors, etc.) and various software interface elements 520 (such as graphical user interface elements, APIs, etc.). The user interface 514 allows an external user to interact with the computer system 500. For example, as discussed preciously herein, a user may provide authentication information to the computer system. This may be input by the user through the user interface 514 by the user supplying various credentials, such as usernames, passwords, fingerprints scans, face recognition, etc. Additionally, the user may use the user interface 514 to interact with the applications (such as applications 104-1 through 104-n).

Those skilled in the art will appreciate that the invention may be practiced in network computing environments with ninny types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. AU changes which come within the meaning and range of equivalency of the claims are to be embraced within their scope.

What is claimed is:

1. In a computing environment, a method of facilitating single sign-on on a device having sandboxed applications, the method comprising:
    identifying a plurality of associated applications, wherein at least a first application of the associated applications is in a different sandbox security container than at least a second application of the associated applications, and wherein each application of the plurality of associated applications comprises authentication information for obtaining services from one or more service providers;
    selecting a primary application from among the plurality of associated applications based on one or more known criteria;
    storing an authentication state at the primary application, wherein the authentication state comprises an authoritative set of state data for each of the plurality of associated applications;
    receiving an authentication request at a non-primary application within the plurality of associated applications; and
    servicing the authentication request via the primary application, wherein authentication information for the non-primary application is derived from the authentication state stored at the primary application.

2. The method of claim 1, wherein selecting a primary application from among the plurality of associated applications based on one or more known criteria comprises identifying an ordered list of applications from the plurality of associated applications to identify back-up locations for the authentication state, the method further comprising storing at least a portion of the authentication state in a top n number of applications from the ordered list.

3. The method of claim 2, wherein storing at least a portion of the authentication state in a top n number of applications from the ordered list is performed as a result of one or more of adding a user account, removing a user account, user interaction to provide authentication input, expiration of pre-determined time, an application version change, or a change in authentication state.

4. The method of claim 2, further comprising determining that the authentication state is no longer available from the primary application due to the primary application being removed from the device, and as a result promoting a top application from the top n application to the primary application.

5. The method of claim 2, further comprising determining that the authentication state is no longer available from the primary application due to the authentication state being unavailable from the primary application, and as a result, the primary application obtaining the authentication state from one of the top n applications.

6. The method of claim 1, wherein selecting a primary application comprises selecting an application based on at least one or more of: an alphabetical order by application name, application versions, software development kit (SDK) versions, protocol versions, a hard coded list, lifetime of applications on the device, frequency of application use, likelihood of application being installed or uninstalled, a specified user preference, or external metrics.

7. The method of claim 1, further comprising, selecting the plurality of associated applications from an allowed list of applications that can be authenticated on the device.

8. The method of claim 1, further comprising receiving a request for information from the authentication state from an application that is not in the plurality of associated applications, determining that the application is not in the plurality of associated applications, and as a result denying the request.

9. The method of claim 1, wherein each of the applications in the plurality of associated applications can communicate with the primary application and with each other.

10. A sandboxed system comprising:
    a memory configured to store a plurality of associated applications, wherein each application of the plurality of associated applications comprises authentication information for obtaining services from one or more service providers;
    a security unit configured to maintain security containers to generate a plurality of sandboxes wherein at least some of the applications in the plurality of associated applications are in different sandboxes; and
    a processor configured to select a primary application from the plurality of associated applications based on one or more known criteria,
    wherein the primary application comprises an authentication state at the primary application, the authentication state comprising an authoritative set of state data for each of the plurality of associated applications including the authentication information for each of the plurality of associated applications, and which is used by the primary application to service one or more authentication request directed to one or more non-primary applications in the plurality of associated applications.

11. The sandboxed system of claim 10, wherein the processor identifies an ordered list of applications from the plurality of associated applications to identify back-up locations for the authentication state, and wherein a top n number of applications from the plurality of associated applications as identified by the ordered list comprise back-up information including at least a portion of the authentication state.

12. The sandboxed system of claim 11, wherein the system comprises an update module that is configured to update the back-up information in the top n number of applications from the plurality of associated applications as a result of one or more of adding a user account, removing a user account, user interaction to provide authentication input, expiration of pre-determined time, an application version change, or a change in authentication state.

13. The sandboxed system of claim 11, wherein the system comprises a validation module that is configured to determine that the authentication state is no longer available from the primary application due to the primary application being removed from the device, and as a result promote a top application from the top n application to the primary application.

14. The sandboxed system of claim 11, wherein the system comprises a validation module that is configured to determine that the authentication state is no longer available from the primary application due to the authentication state being unavailable from the primary application, and as a result, cause the primary application to obtain the authentication state from one of the top n applications.

15. The sandboxed system of claim 10, wherein the processor is configured to select the primary application based on at least one or more of: an alphabetical order by application name, application versions, software development kit (SDK) versions, protocol versions, a hard coded list, lifetime of applications on the device, frequency of application use, likelihood of application being installed or uninstalled, a specified user preference, or external metrics.

16. The sandboxed system of claim 10, further comprising an allowed applications data structure, wherein the applications in the plurality of associated applications are selected from an allowed list of applications in the allowed application data structure that can be authenticated on the device.

17. The sandboxed system of claim 10, wherein each of the applications in the plurality of applications is configured to receive a request for information from the authentication state from an application that is not in the plurality of associated applications, determine that the application is not in the plurality of associated applications, and as a result deny the request.

18. The sandboxed system of claim 10, wherein each of the applications in the plurality of associated applications is configured to communicate with the primary application and with each other.

19. A sandboxed system comprising:
one or more processors; and
one or more computer-readable hardware storage devices comprising computer executable instructions that are executable by the one or more processors for causing the sandbox system to perform the following:
an election algorithm computation, wherein the election algorithm computation comprises:
identifying a plurality of associated applications, wherein at least a first application of the associated applications is in a different sandbox than at least a second application of the associated applications, and wherein each application of the plurality of associated applications comprises authentication information for obtaining services from one or more service providers; and
selecting a primary application from among the plurality of associated applications based on one or more known criteria; and
storing an authentication state at the primary application, wherein the authentication state comprises the authoritative set of state data for each of the plurality of associated applications;
receiving an authentication request at a non-primary application within the plurality of associated applications; and
servicing the authentication request via the primary application, wherein authentication information for the non-primary application is derived from the authentication state stored at the primary application.

20. The system of claim 19, wherein the election algorithm computation further comprises identifying an ordered list of applications from the plurality of associated applications to identify back-up locations for the authentication state, and wherein the applications in the plurality of associated applications are configured to store at least a portion of the authentication state in a top n number of applications from the ordered list.

* * * * *